United States Patent
Hsue et al.

(10) Patent No.: US 12,504,796 B2
(45) Date of Patent: Dec. 23, 2025

(54) FAULT-TOLERANT COOLING FOR ADD-IN CARD

(71) Applicant: NVIDIA CORPORATION, Santa Clara, CA (US)

(72) Inventors: Eugene Yan Ki Hsue, San Ramon, CA (US); Sahba Etaati, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 327 days.

(21) Appl. No.: 18/012,781

(22) PCT Filed: Jun. 22, 2021

(86) PCT No.: PCT/US2021/038477
§ 371 (c)(1),
(2) Date: Dec. 23, 2022

(87) PCT Pub. No.: WO2021/262714
PCT Pub. Date: Dec. 30, 2021

(65) Prior Publication Data
US 2023/0259181 A1 Aug. 17, 2023

Related U.S. Application Data

(60) Provisional application No. 63/042,748, filed on Jun. 23, 2020.

(51) Int. Cl.
*H05K 7/20* (2006.01)
*G06F 1/18* (2006.01)
*G06F 1/20* (2006.01)

(52) U.S. Cl.
CPC ................ *G06F 1/20* (2013.01); *G06F 1/185* (2013.01)

(58) Field of Classification Search
CPC .................................. G06F 1/20; G06F 1/185
USPC ......................................................... 361/695
See application file for complete search history.

(56) References Cited

U.S. PATENT DOCUMENTS

| 5,727,221 | A  | * | 3/1998 | Walsh ...................... | G06F 1/325 |
|---|---|---|---|---|---|
|  |  |  |  |  | 713/323 |
| 5,862,037 | A  | * | 1/1999 | Behl ....................... | G06F 1/203 |
|  |  |  |  |  | 361/679.48 |
| 6,058,009 | A  | * | 5/2000 | Hood, III ................ | G06F 1/203 |
|  |  |  |  |  | 361/679.55 |
| 6,362,958 | B1 | * | 3/2002 | Yu ............................ | G06F 1/20 |
|  |  |  |  |  | 165/104.34 |
| 6,414,845 | B2 | * | 7/2002 | Bonet ................ | H05K 7/20581 |
|  |  |  |  |  | 312/236 |

(Continued)

*Primary Examiner* — Anatoly Vortman
(74) *Attorney, Agent, or Firm* — Hogan Lovells US LLP

(57) ABSTRACT

An add-in device (100) for use in a host server (300) is capable of operating for an extended time after the host server (300) stops providing power to the add-in device (100). The add-in device (100) may include a circuit board assembly (110) and a cover (120) that define a duct through the add-in device (100). An inlet (170) of the duct receives cooling air flow that the host (300) normally drives through the duct. A blower (160) inside the duct may operate from a backup power source (140) to pull air flow through the duct to maintain forced convection cooling when the host (300) fails to provide power or cooling air flow to the add-in device (100). The backup power can also continue operation of the device (100) to execute a shutdown procedure after the host fails.

11 Claims, 6 Drawing Sheets

(56) References Cited

U.S. PATENT DOCUMENTS

| | | | |
|---|---|---|---|
| 6,563,703 B2* | 5/2003 | Xie | G06F 1/20 |
| | | | 361/679.48 |
| 6,778,390 B2* | 8/2004 | Michael | H01L 23/467 |
| | | | 361/679.48 |
| 10,085,361 B2* | 9/2018 | Lin | H05K 7/20436 |
| 10,278,308 B2* | 4/2019 | Han | G06F 1/20 |
| 10,739,831 B2* | 8/2020 | Shabbir | G06F 1/20 |
| 11,343,902 B2* | 5/2022 | He | H05K 7/20336 |
| 2001/0024358 A1 | 9/2001 | Bonet | |
| 2003/0117760 A1* | 6/2003 | Meir | G06F 1/20 |
| | | | 361/103 |
| 2005/0174737 A1* | 8/2005 | Meir | G06F 1/20 |
| | | | 361/697 |
| 2006/0039120 A1* | 2/2006 | Young | G06F 1/186 |
| | | | 361/719 |
| 2007/0281639 A1* | 12/2007 | Clidaras | G06F 1/20 |
| | | | 455/575.1 |
| 2011/0286176 A1* | 11/2011 | Malmberg | H05K 7/20581 |
| | | | 361/679.48 |
| 2014/0340834 A1 | 11/2014 | Lee et al. | |
| 2015/0346783 A1 | 12/2015 | Kinstle, III | |
| 2021/0181817 A1* | 6/2021 | Lu | G06F 1/20 |
| 2023/0262936 A1* | 8/2023 | Hsue | H05K 7/2039 |
| | | | 361/720 |
| 2023/0284371 A1* | 9/2023 | Sun | H05K 7/20154 |
| | | | 361/679.47 |

* cited by examiner

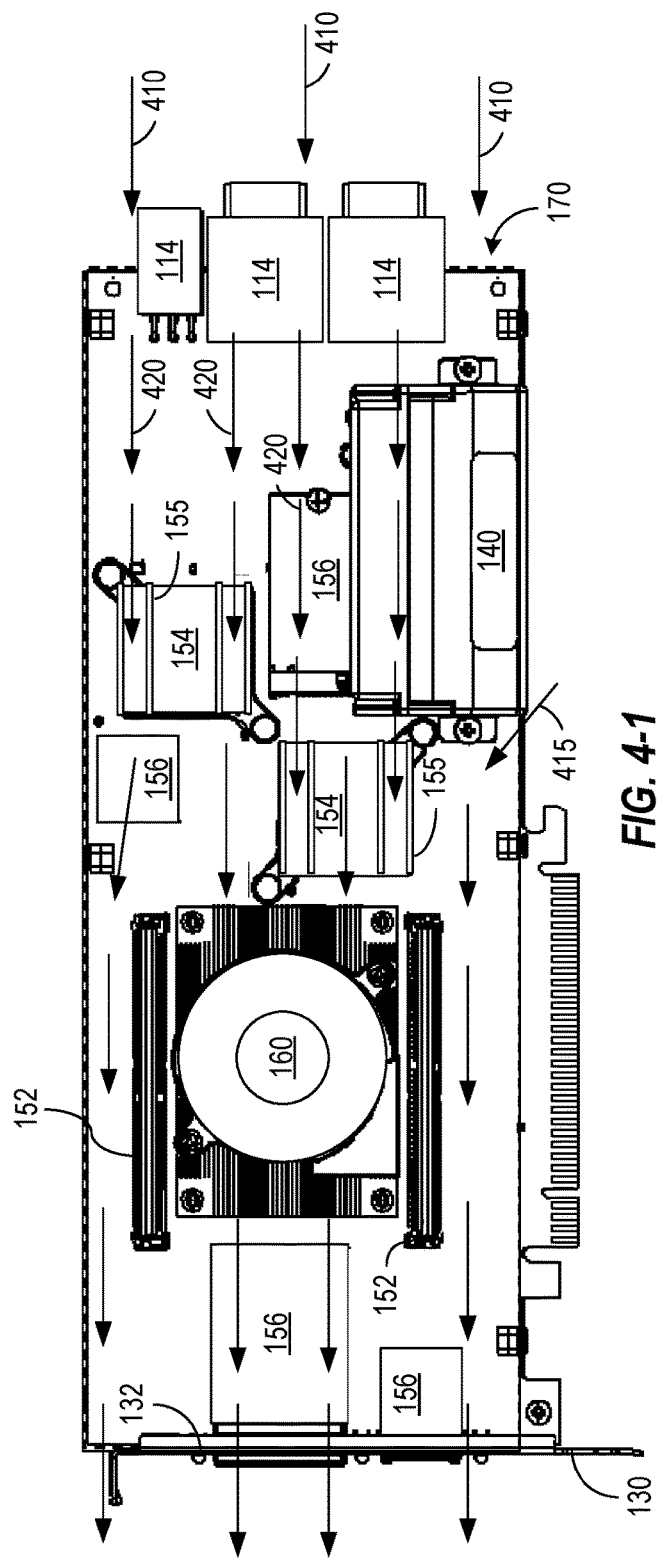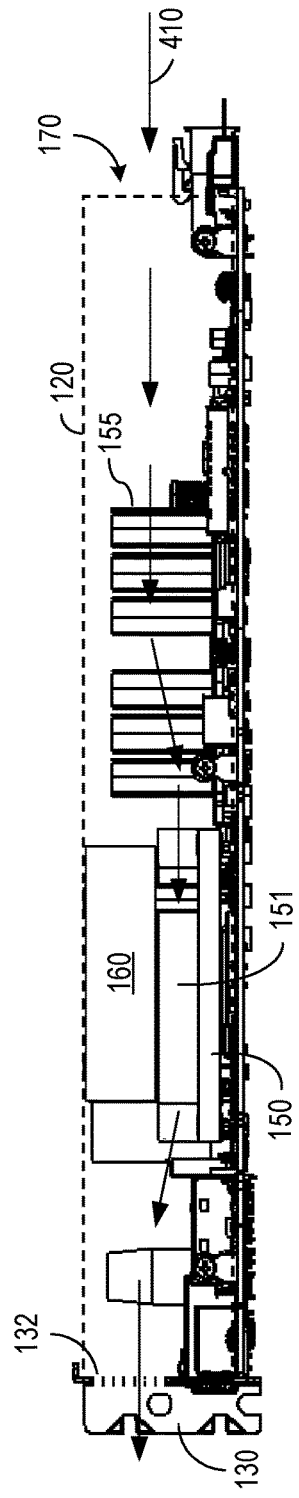
FIG. 4-1
FIG. 4-2

FAULT-TOLERANT COOLING FOR ADD-IN CARD

CROSS-REFERENCE TO RELATED APPLICATION

This application is a 371 National Stage Entry of International Application PCT/US2021/38477, filed Jun. 22, 2021, which in turn claims priority to U.S. Provisional Application 63/042,748, filed Jun. 23, 2020, both titled FAULT-TOLERANT COOLING FOR ADD-IN CARD.

BACKGROUND

Standard rack mount servers commonly contain add-in devices, e.g., add-in cards, that may be installed in different configurations. Such servers generally have fans that provide airflow for forced convection cooling of server systems including the add-in devices. If a server loses power, the fans in the server stop operating. Most add-in devices also stop operating when their host server loses power. Some add-in devices may continue to operate for a short time after their host server loses power, but the continued operating time is short enough that power used during continued operation does not create enough heat to require forced-air convection cooling. Some add-in devices might benefit from the ability to continue operating for a longer duration after a host server loses power, but extended operation may cause components of the add-in devices to overheat if the host server is not providing cooling.

BRIEF DESCRIPTION OF THE DRAWINGS

FIGS. 4-1 and 4-2 show top and side view of a server add-in card having air flows in accordance with an example of the present disclosure when just server fans are operating.

FIGS. 5-1 and 5-2 show top and side view of a server add-in card having air flows in accordance with an example of the present disclosure when just the blower in the add-in card is operating.

The drawings illustrate examples for the purpose of explanation and are not of the invention itself. Use of the same reference symbols in different figures indicates similar or identical items.

DETAILED DESCRIPTION

Figure 1:
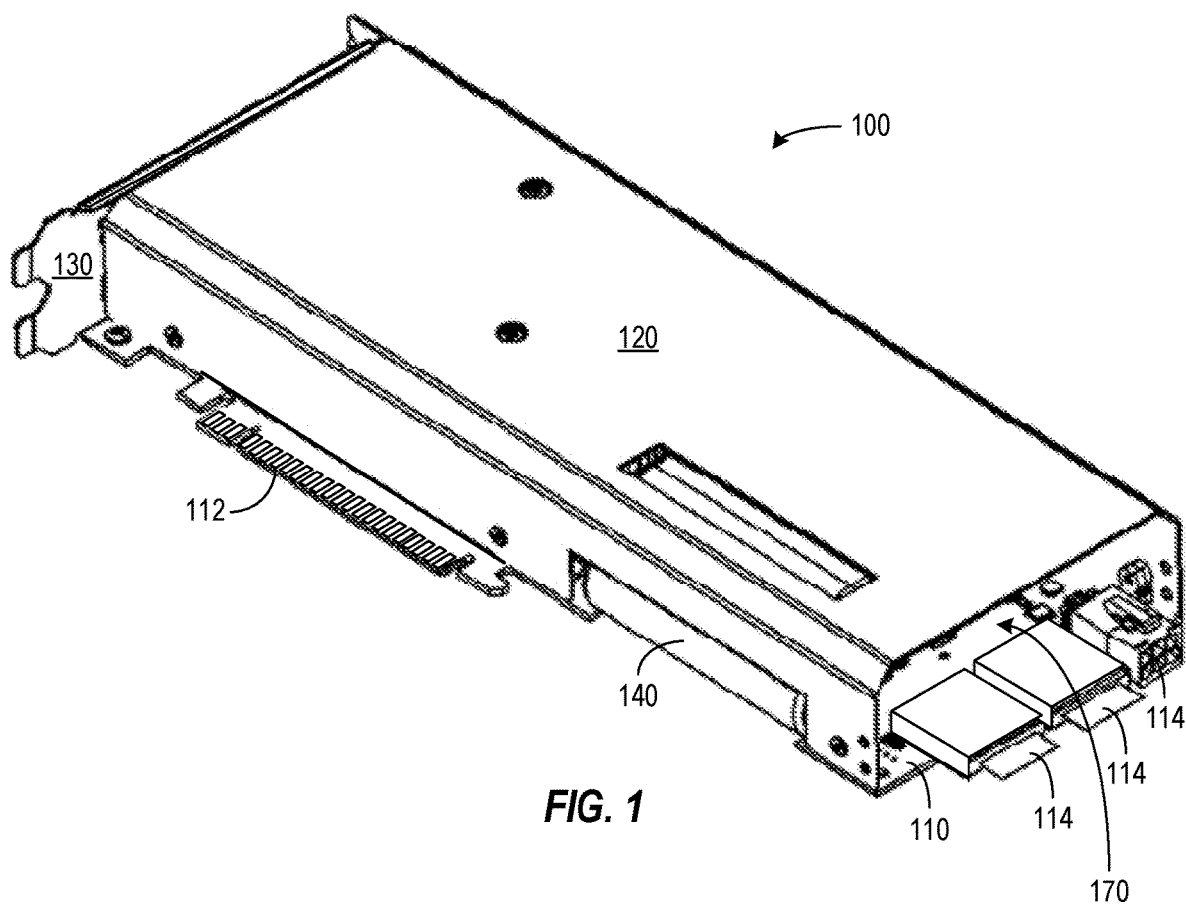
FIG. 1 shows a perspective view of an add-in card in accordance with one example of the present disclosure.

In accordance with an aspect of the present disclosure, an add-in card in a host server or other host computing system may continue to operate for several or tens of minutes after the host loses power and particularly after the host stops providing power or cooling to the add-in card. For example, an add-in card mounted in a host server includes an air circulator, e.g., fan or blower, and a backup power system such as a battery unit, and the add-in card uses backup power to continue operation when the add-in card or battery unit senses a loss of power from the host server. The backup power system may further power the air circulator in the add-in card to provide air flow for forced convection cooling that prevents critical components of the add-in card from overheating while the host is not providing cooling. In alternative configurations, the air circulator in the add-in card may run continuously during normal operation of the add-in card, or the air circulator in the add-in card may be turned off during normal operation and operated only if cooling is needed when the add-in card continues operation while server power or cooling is off. The air circulator when operating continuously may complement the server-supplied airflow during normal operation, and air flow for the add-in card may be channeled through a duct formed in the add-in card to avoid fundamentally altering other air flows used for the server system cooling. Whether the air circulator operates during normal operation or just when the host lost power or cooling, the air circulator in the add-in card may act as the primary source of airflow for the add-in card when the add-in card is running on backup (battery) power or when the host fails to provide an air flow for cooling.

In one example of the present disclosure, an add-in card in a host computing system may continue to operate for several or tens of minutes after the host computing system loses power. For example, the add-in card may perform a safe shutdown procedure to ensure data is safely saved or persisted in non-volatile storage of the add-in card and any peripherals connected to the add-in card. The safe shutdown procedure may guarantee that the add-in card, the host, or any connected systems may recover and resume operation without the power loss having caused data loss or corruption. For the extended operation of the add-in card, adequate airflow is maintained to prevent critical components on the add-in card from overheating and malfunctioning. An add-in card in accordance with one aspect of the current disclosure may employ a built-in fan or blower to provide forced convection cooling to the add-in card without (or with) power from the host server. Operation of the add-in card including the fan or blower may continue for several minutes under a condition where the host has, for example, powered down, lost power, or otherwise failed. During normal operations, the card-based cooling operates in a way that does not fundamentally alter server system cooling.

Figure 2:
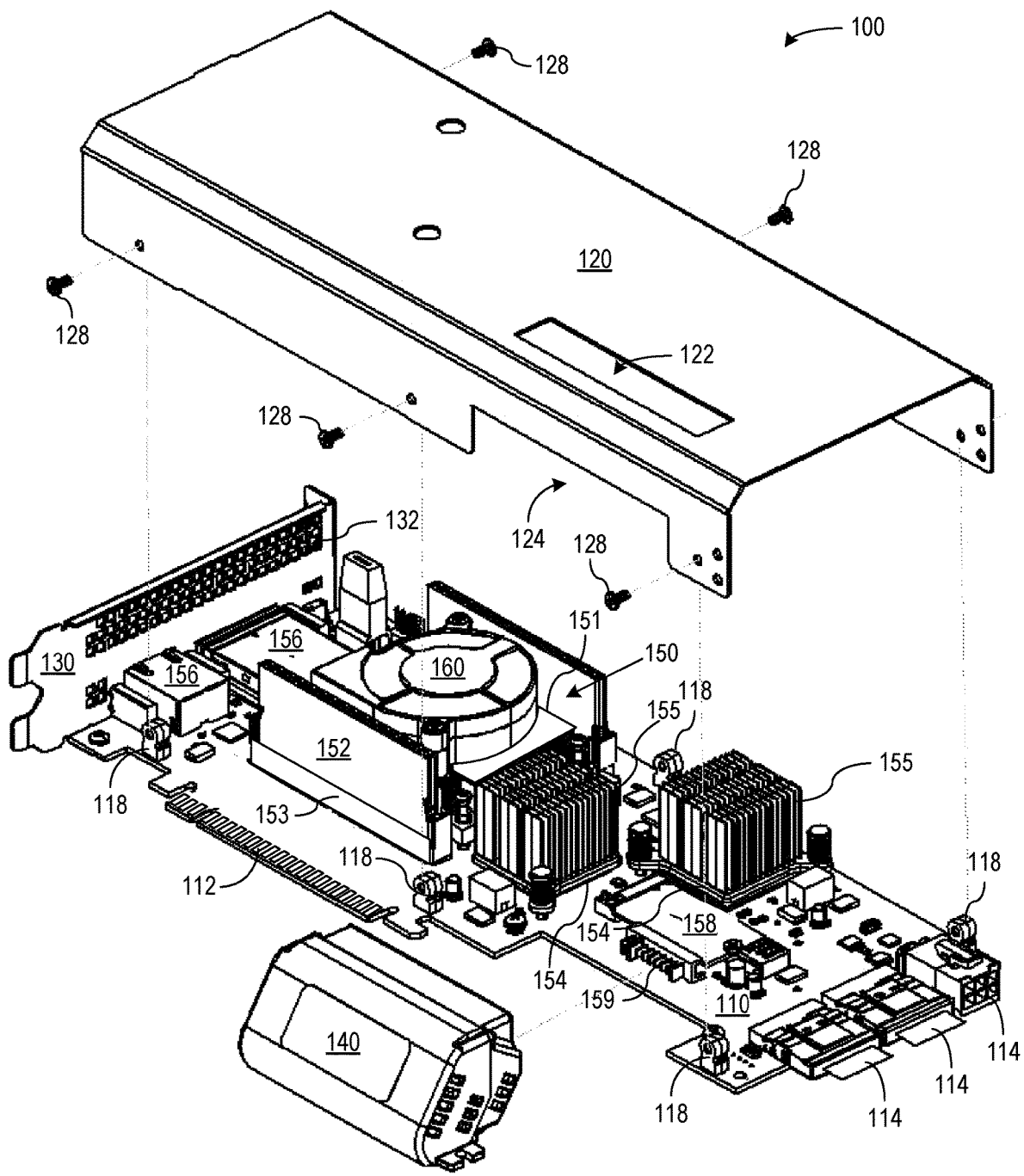
FIG. 2 shows an exploded view of the add-in card of FIG. 1.

FIGS. 1 and 2 respectively show assembled and exploded views of one example of an add-in card 100 in accordance with one example of the present disclosure. The term "add-in card" is used herein in a general sense to refer to an electronic device that may be added to or used in different computer systems, and a common example of an add-in card includes a circuit board assembly with terminals that may be plugged into a slot or socket on an industry-standard bus in a host computer such as a host server. Add-in card 100 in the illustrated example is generally configured to be installed in a host server and may be compliant with one or more industry standards that computer systems use. For example, add-in card 100 may be compliant with Industry Standard Architecture (ISA), Extended Industry Standard Architecture (EISA), Micro Channel Architecture (MCA), Peripheral Component Interconnect (PCI), PCI Express (PCI-X), or Small Computer Systems Interface (SCSI) standards.

The primary elements of add-in card 100 include a circuit board assembly 110 and a cover 120. As used herein, "circuit board assembly" refers to a circuit board that may further include electronic or mechanical components. Circuit board assembly 110 particularly includes a printed circuit board with terminals 112 arranged to fit into a slot or socket in a host such as a server or other computer system in which add-in card may be installed. Terminals 112 may provide electrical power and signal connections between add-in card 100 and the host. Assembly 110 may further include auxiliary connectors 114, e.g., one or more signal interface connectors or auxiliary power connectors, that provide additional electrical power or signal connections of add-in card 100 to the host or other electronic systems. A panel 130 attached perpendicularly to one end of circuit board assembly 110 may engage mechanical features of the host server, so that panel 130 provides additional mechanical mounting that secures add-in card 100 with terminals 112 engaged in a socket for operation inside the host server.

Add-in card 100, in the illustrated example, further includes a backup power unit 140 that may plug into circuit board assembly 110 and be held in place by cover 120. One example of backup power unit 140 for add-in card 100 may include a battery, e.g., a rechargeable laptop battery. Associated charging and power control circuits may reside on circuit board assembly 110 or in backup power unit 140. In one example, charging and battery management circuitry is housed entirely in the battery module 140, and no battery circuitry is on the rest of circuit board assembly 110. Backup power unit 140 in one example of the present disclosure includes one or more rechargeable batteries, a charger for the battery or batteries, control circuitry that controls whether backup power unit 140 is being charge or is providing power, and a sensor that senses whether add in card 100 is receiving external power, e.g., from the host or from an auxiliary power line and/or receiving a cooling air flow. The charging circuits generally keep backup power unit 140 charged when the host server provides power to add-in card 100, and backup power unit 140 may provide backup power to assembly 110 when the host stops providing power to add-in card 100.

The exploded view of FIG. 2 further reveals active electronic components of circuit board assembly 110 that are generally inside cover 120 when add-in card 100 is assembled as shown in FIG. 1. As shown in FIG. 2, circuit board assembly 110 includes electronic components 150, 152, 154, 156, and 158 that implement functions of add-in card 100. In the illustrated example, assembly 110 more particularly includes a main processor 150 with associate memory 152, e.g., DIMM modules, one or more co-processors 154, a solid-state drive or non-volatile storage unit 158, and other integrated circuits and electronic components 156 such as interface circuits, non-volatile memory, voltage converters, clock circuits, resistors, capacitors, and inductors that may be mounted in sockets or soldered of circuit board assembly 110. In the illustrated example, circuit board assembly 110 includes a socket 159 for backup power unit 140, so that backup power unit 140 may easily be removed and repaired or replaced.

In general, electronic components 150, 152, 154, 156, and 158 consume electrical power and generate waste heat. Some components 150 and 154, e.g., processor or controller integrated circuits, are integrated circuits that generate significant heat in compact areas and have associated heat sinks or spreaders 151 and 155 on the integrated circuits to pull away heat. Heat sinks or spreaders 151 and 155 may have fins or other cooling structures to disperse the heat through conduction, radiation, or convection. Heat sinks or spreaders 151 or 155 generally have channels or gaps for air flows through their fins or other cooling structures. As described further below, main processor 150, in the implementation shown in FIG. 2, has a blower 160 on the heat sink 151 of main processor 150. Alternatively, other types of air circulators such as fans could be employed. Operation of blower 160 draws or helps create air flows through the heat sink or spreader 151 of main processor 150, and air drawn up through heat sink or spreader 151 can cause or help cause air flows from inlet 170 along the surfaces of circuit board assembly 110 and the electronic or thermal components 152, 154, 155, 156, and 158 mounted of circuit board assembly 110.

In accordance with a further aspect of the present disclosure, removable cover 120 of add-in card 100 performs multiple functions. Cover 120 for printed circuit board assembly 110 secures and protects critical components (e.g., electronic components 150, 152, 154, 156, and 158 of circuit board assembly 110), acts as a structural exoskeleton to provide mechanical stiffness to add-in card 100, controls and improves the flatness of circuit board assembly 110, and functions as a baffle or a portion of a conduit or duct to direct the air flow within add-in card 110. The shape and length of cover 120 may particularly work in conjunction with on-board blower 160, placement of components 150, 152, 154, 156, and 158 and panel vents 132 to direct the air flow within add-in card 100 in a controlled and predictable manner, regardless of variable host environments for which add-in card 100 is intended to operate.

Cover 120 may be made using a metal sheet cut and bent to a length, width, and height required for add-in card 100 and having openings or features that accommodate attachment to circuit board assembly 110 and provide space for components of add-in card 100. A metal such as an aluminum alloy or galvanized steel generally has superior impact resistance when compared to other materials of the same thickness and therefore can protect fragile components such as heat sinks or spreaders and integrated circuits of circuit board assembly 110. Metal sheeting is also a relatively rigid material, and cover 120 has four bends, extending along its length, which in conjunction with the thickness of the material of cover 120, creates superior stiffness to limit bending along the length of add-in card 120 and to limit racking or twisting along the width and height of add-in card 100. In illustrated example, cover 120 has a generally flattened U-shaped cross-section with two flat sides that are parallel to each other and extend about the same length as circuit board assembly. A top of cover 120 may be flat and perpendicular to the sides, and each transition between a side and the top includes two acute angle bends, e.g., 45° bends, instead of a single 90° bend. The terms side and top are used here to indicate relative orientation, and in general, add-in card 100 may be installed with different orientations, e.g., vertical or horizontal, so that a side, the top, or the circuit board may be the highest or lowest part of the device 100. In one example configuration, cover 120 is about 4 inches wide, about 1.3 inches tall, and about 10.5 inches long when circuit board assembly 110 has a width of about 4 inches and a length of about 10.5 inches.

The sides of cover 120 may be further cut or shaped to have two straight, e.g., sheared, edges that act as straight-edges for support of printed circuit board assembly 110. A straight edge support may be important to ensure that the circuit board is straight and flat (not warped) so that terminals 112 may be easily aligned with and inserted into a socket in a host device. Holding flatness also protects the integrity of solder joints and signal integrity of the electrical signals running through traces in printed circuit board assembly 110. Rigidity that cover 120 provides may also be important to prevent flexing that could damage the circuit board or other components of assembly 110. In one example of the present disclosure, printed circuit board assembly 110 has posts 118 affixed to the circuit board for attachment of cover 120 using fasteners 128, e.g., screws or bolts, and posts 118 reside inside cover 120 and slightly offset from the nearest edge of circuit board assembly 110. Post 118 being affixed inside cover 120 may thus place edges of cover 120 in direct contact with a primary surface of the circuit board along substantially the entire length of printed circuit board assembly 110. The contact of the edges of cover 120 along the length of printed circuit board 110 controls the flatness of add-in card 100 to a high degree. In one configuration, posts 118 have threaded openings extending parallel to the surface of the circuit board to accept fasteners 128 and hold cover 120 and printed circuit board 110 together.

As shown in the example of FIGS. 1 and 2, cover 120 includes openings 122 and 124, e.g., two rectangular cutouts, respectively on the top or side of cover 120. The positions, sizes, and shapes of openings 122 and 124 may be chosen to provide space for backup power unit 140 and help to secure backup power unit 140 to assembly 110 by limiting the displacement of backup power unit 140.

In accordance with a further aspect of the present disclosure, cover 120 may have a height selected to act as a secondary constraint that prevents one or more of components 150, 152, 154, 156, and 158 from unintentionally dislodging from sockets on circuit board assembly 110. In particular, memory 152 may include DIMM modules plugged into associated sockets on circuit board assembly 110, and the height of cover 120 may be about the same as the height that the DIMM modules 152 (or other tallest electronic components) extend above the circuit board when plugged into their sockets 153. The limited height of cover 120 may not provide room for removal of the plugged-in modules, so that cover 120 may thus prevent the modules form dislodging from their sockets on printed circuit board assembly 110 while cover 120 is attached to circuit board assembly 110. Similarly, portions of cover 120 are adjacent to or contact backup power unit 140 and constrain movement of backup power unit 140 to prevent backup power unit 140 from unplugging from its socket 159 on circuit board assembly 110 while cover 120 is attached to circuit board assembly 110. Constraint of backup power unit 140 may be critical because backup power unit 140 may include batteries that are relatively heavy, making backup power unit 140 easily dislodged during movement of add-in card 100. Cover 120 may additionally contact or otherwise limit the freedom of movement of other electronic components on circuit board assembly 110.

Figure 3:
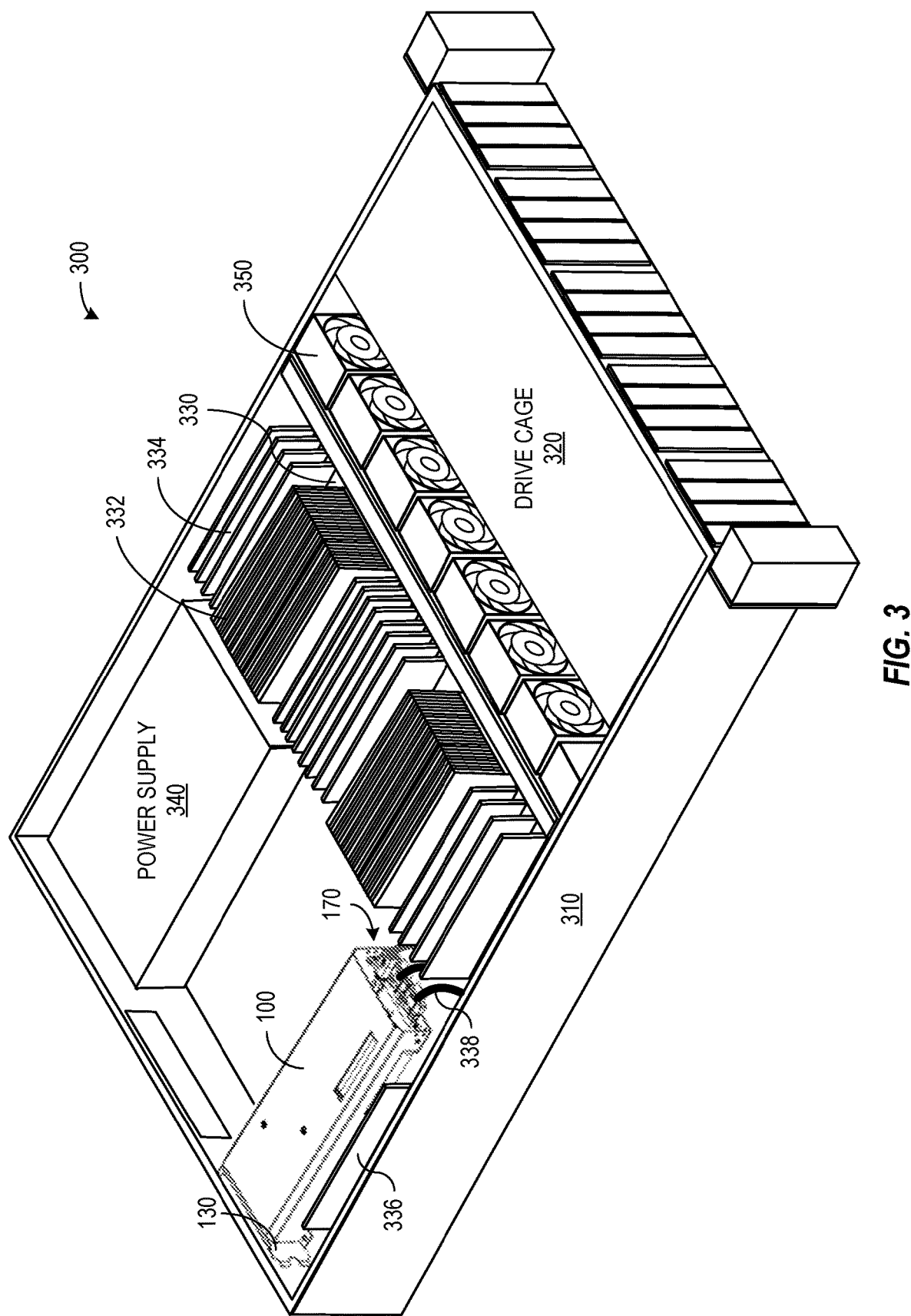
FIG. 3 shows a perspective view of a server system including host server hardware with an add-in card in accordance with one example of the present disclosure.

Another function of cover 120 is to define a conduit or duct for air flow through add-in card 100, when add-in card 100 is installed in a host. FIG. 3, for example, shows a perspective view of a host server 300 in accordance with one example of the present disclosure. Server 300 includes a chassis 310 containing conventional server systems 320, 330, 340, and 350 and one or more an add-in card 100 such as described above. Chassis 310 may be sized and shaped for mounting in a standard rackmount or pedestal server chassis (not shown). In an example of a typical rackmount server, chassis enclosure 310 may contain a drive cage 320 containing one or more removable storage devices such as hard disk drives, a motherboard 330 with one or more processors 332 and memory such as DIMM modules 334, a power subsystem 340 that provides power to the other server systems and to add-in cards/devices such as add-in card 100, and one or more air circulators such as cooling fans 350. Add-in card 100 alone or with other add-in devices may be installed in server system 300 by plugging terminals 112 of device 100 or 340 into respective sockets in server system 300, e.g., on a riser 336 extending from motherboard 330, and/or connecting cables 338 between each device 100 and sever systems 320. Cable 338 may, for example, connect between motherboard 330 and auxiliary connector 114 on add-in card 100.

Server 300, as noted above, has one or more cooling fans 350. Cooling fans 350 may be desired to pull an airflow through some server systems 320 from one face, e.g., the front, of chassis 310 and push the air flow back through other server systems, e.g., push air through the heat spreaders of processors 332 on server motherboard 330. Cooling fans 350 also push an air flow through add-in device(s) 100. In accordance with an aspect of the present disclosure, cover 120 and circuit board assembly 110 of add-in card 100 forms a duct or conduit with an open end 170 acting as an inlet of the duct defined by cover 120 and circuit board assembly 110 in add-in card 100. Inlet 170 and openings 122 and 124 in cover 120 of add-in card 100 receive air flows from fans 350, and the duct defined by cover 120 and circuit board assembly 110 directs the air flows through add-in card 100 and out of an outlet provided by panel vents 132 in panel 130 of add-in card 100.

FIGS. 4-1 and 4-2 show top and side views of add-in card 100 with air flows in accordance with an example in which just the fans in the host server are operating. (Memory modules 152 are not shown in FIG. 4-2 and only a dashed outline of cover 120 is shown in FIGS. 4-1 and 4-2 to better illustrate the air flows.) As shown in FIGS. 4-1 and 4-2, air flows 410 and 415 from the server fans enter add-in device 100. Air flows 410 enter through inlet 170 at one end of add-in card 100. Other air flows 415 from the server fans may enter through side or top openings, e.g., openings 122 and 124 in cover 120 shown in FIG. 2. The duct defined by circuit board assembly 110 and cover 120 channels entering air flows 410 and 415 through add-in card 100 as air flows 420, which are generally along a length axis or direction of add-in card 100. For example, flows 420 generally pass along the duct formed by circuit board assembly 110 and cover 120, passing along components 150, 152, 154, and 156 and passing through heat sinks or spreaders 151 and 155, before exiting add-in card 100 through an outlet provided by panel vents 132 in panel 130. For efficient cooling, heat sinks or spreaders 151 and 155 of circuit board assembly 110 are ideally oriented so that gaps between fins of heat sinks or spreaders 151 and 155 extend along the air flow direction 420.

Figures 1, 5:
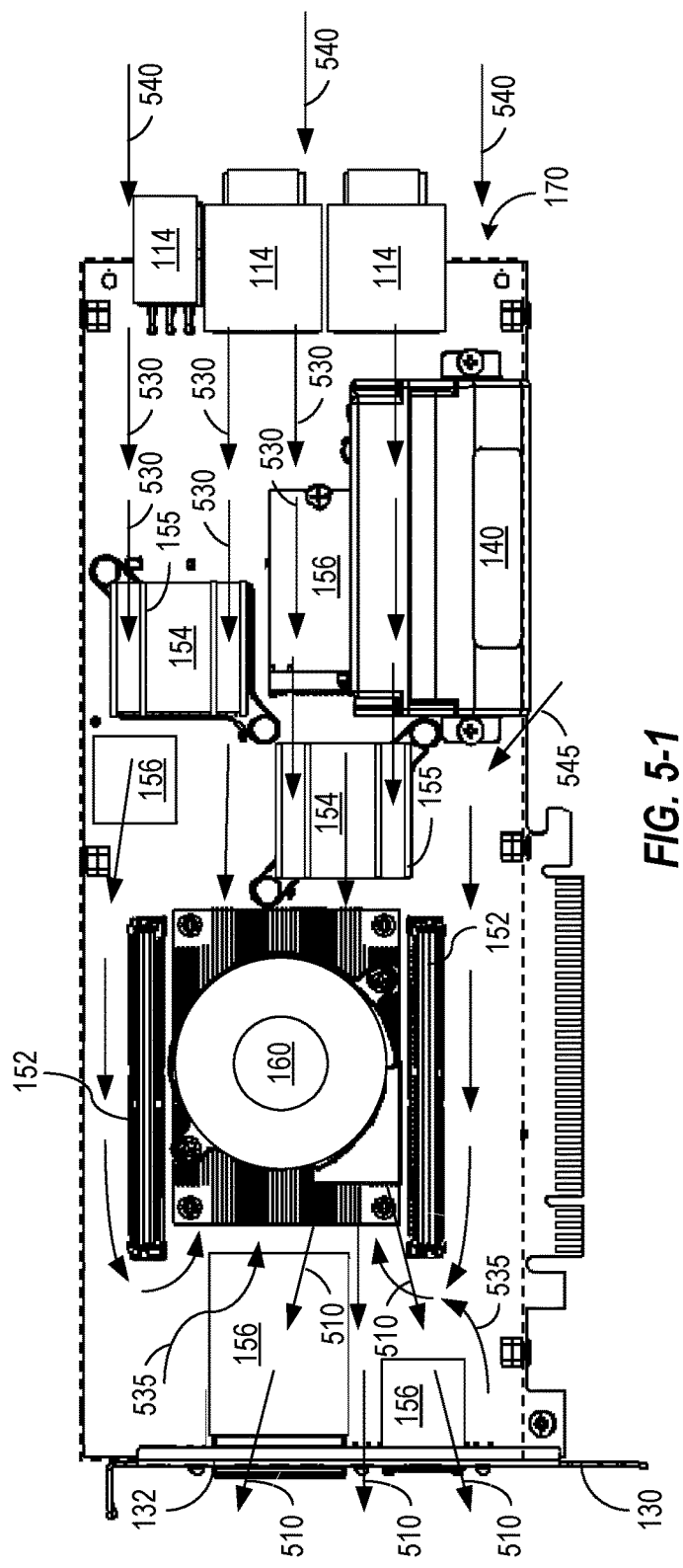
Figures 2, 5:
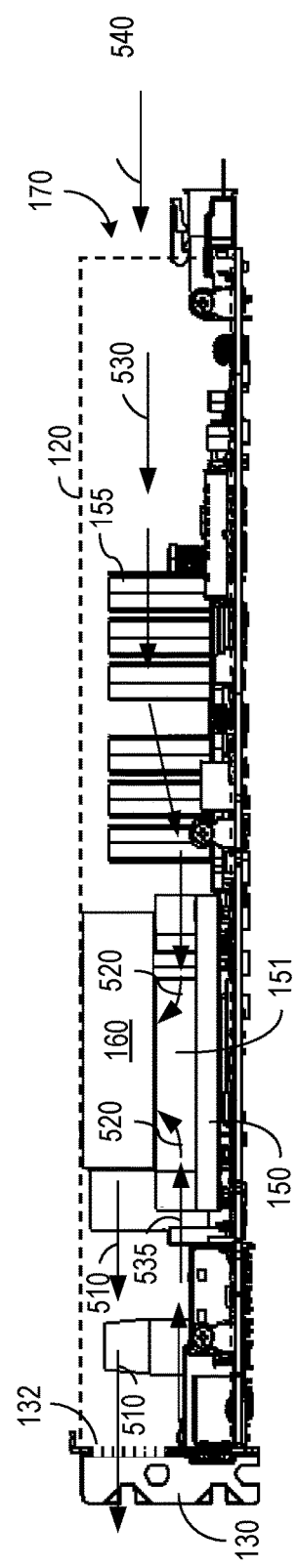

FIGS. 5-1 and 5-2 show top and side views of add-in card 100 with air flows in accordance with an example in which just blower 160 in add-in card 100 operates for cooling. (Again, memory modules 152 are not shown in FIG. 5-2 to better illustrate the air flows.) As shown in FIGS. 5-1 and 5-2, blower 160 is atop heat sink or spreader 151 of main processor 150 and pushes an air flow 510 out of add-in card 100 through the outlet provided by panel vents 132. Blower 160 also draws air 520 up through heat sink or spreader 151. As a result, air flows 530 on the server side, i.e., on the inlet side of the air duct, of blower 160 are generally pulled along the duct formed by circuit board assembly 110 and cover 120 in the same manner or directions as air flows (e.g., flows 420) that the server fans would push through add-in card 100. Accordingly, air flows 530 flow through heat sinks or spreaders 155 located on the inlet side from blower 160, along the gaps between the fins of heat sinks or spreaders 155 in the same manner as air flows 420 from server fans. Air flows 535 on into heat sink or spreader 151 from the lower regions on the panel side, i.e., the outlet side, of add-in card 100 are generally opposite to the direction of air flows 420 that the sever fans would push through add-in card 100 and opposite to the flows 510 that blower 160 pushes out of the outlet provided by panel vents 132.

In accordance with an important aspect of the present disclosure, air flows 540 and 545 drawn into add-in card 100 from inside the server chassis are in the same directions that the server fans would push air flows 410 and 415 into add-in card 100. Accordingly, blower 160 may be operated at the same time as the server fans and provide a superposition of the flows shown in FIGS. 4-1 and 5-1 inside add-in card 100, but the combined flows into add-in card 100 are in substantially the same directions as the inflows pushed by server fans alone. Blower 160 may thus be operated at the same time as the server fans to assist or improve air flows without significantly changing the cooling operations in the rest of the host server.

Blower 160 as noted above is inside the duct that circuit board assembly 110 and cover 120 form. Blower 160 is used as the air circulator in this particular example because a blower can draw air in one direction, e.g., an inflow direction that is generally upward, and direct out flowing air flow in an outflow direction generally perpendicular to the inflow direction. This allows air flows into blower 260 to be most concentrated in the heat sink or spreader 151 of the main processor 150. The most forced convection cooling may thus occur where the most heat generation is expected, e.g., by main processor 150. Additionally, a relatively large area, e.g., a diameter of about 40 mm, of blower 160 can be accommodated in the relatively restricted height, e.g., about 10 mm, between the circuit board and the top of cover 120. Other air circulators could alternatively be employed in an add-in device such as add-in device 100. For example, an electric fan may be placed anywhere along the length of the duct to pull air into inlet 170 of add-in device 100 and push air out of the outlet provided by panel vents 132. The diameter of a fan that provides incoming and outgoing air flows along the same axis may be limited to the height of the duct space between circuit board assembly 110 and the top plate of cover 120.

Figure 6:
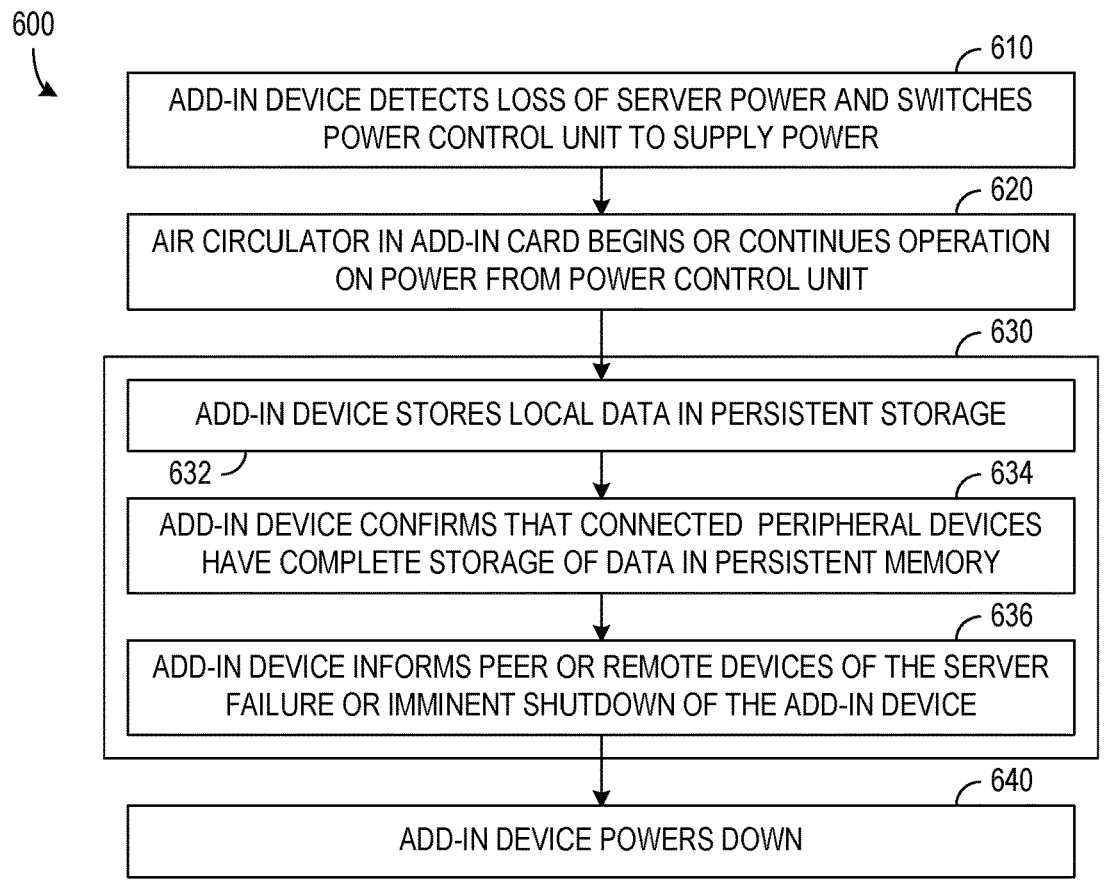
FIG. 6 is a flow diagram of a safe shutdown process in accordance with an example of the present disclosure.
Figure 7:
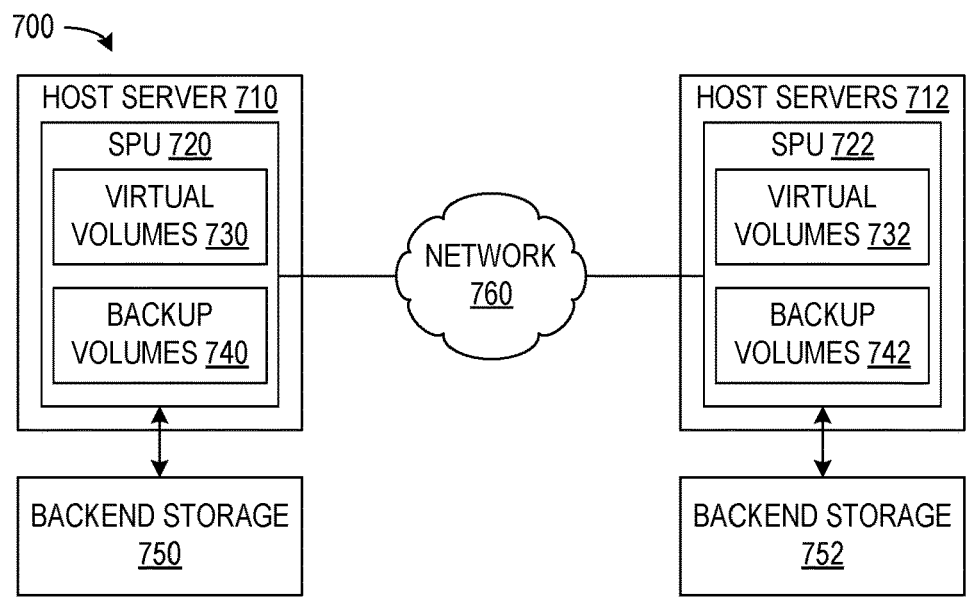
FIG. 7 is a block diagram of a storage system according to an example of the present disclosure using add-in devices in multiple hosts.

FIG. 6 is a flow diagram of a shutdown process 600 that an add-in device such as device 720 shown in FIG. 7 may perform when a host 710 stops providing power or otherwise fails. In the example of FIG. 7, device 720 is in host server 710 and is part of an enterprise storage system 700. For this application, device 720 is a storage processing unit (SPU) and takes the form of an add-in card having substantially the same structure as add-in card 100. Device 720 particularly includes a circuit board assembly 110, a cover 120, and a power control unit 140 as described above with reference to FIGS. 1 and 2, and the circuit board assembly and cover of device 720 may form a duct in which a processor with a heat sink and a blower resides. Device 720 may further plug into or connect to server system 710 as add-in card 100 may plug into or connect to server system 300 as described above with reference to FIG. 3. SPU 720 during normal operation receives power and cooling air flow from host server 710 and operates to present one or more virtual storage volumes 730 that host server 710 (or storage client devices) may access for storage operations such as writing and reading of data. Virtual volumes 730, which SPU 720 maintains, may be referred as being owned by SPU 720. SPU 720 may further control associated backend storage 750, e.g., a peripheral or external storage device, for physical storage of data corresponding to owned virtual volumes 730.

System 700 further includes one or more other host servers 712, each of which contains an SPU 722 that owns one or more virtual volumes 732 that storage clients using system 700 may access. Each SPU 722 controls associated backend storage 752 to physically store the data corresponding to virtual volumes 732 that the SPU 722 owns. Each SPU 722 may be structurally similar or identical to SPU 720, and SPUs 720 and 722 connect to a network 760 that permits the SPUs 720 and 722 to communicate with each other. SPUs 720 and 722 may particularly communicate so that one or more virtual volumes 730 owned by SPU 720 may have respective backup virtual volumes 742 maintained by another SPU 722 and so that one or more virtual volumes 732 owned by one or more SPUs 722 may have backup virtual volumes maintained by SPU 720.

SPU 720 in host server 710 may perform shutdown process 600 of FIG. 6 when host server 710 crashes or stops providing power to SPU 720. In a process block 610, an add-in device such as SPU 720 detects a loss of server power and its power control unit switches, e.g., from a battery charging or maintenance mode, to providing power to the add-in device. For example, backup power unit 140 as described above may include circuits that sense the loss of host power and smoothly transitions the add-in card from operating on host power to operating on backup power without interrupting operation of the add-in card. At this point, the air circulator in the add-in device begins or continues operation on backup power as shown in process block 620.

The add-in device in process block 630 may perform operations that may be necessary or useful for a safe shutdown that will permit resumption of operation with no or a minimum loss of data or functionality. In process block 630, the add-in card may execute a program or routine to collect information such as information about the status of the host or the condition that cause the need for backup power, persist data in the add-in card that is needed or useful for resumption of operation, attempt to place in a safe mode any devices or peripherals that the add-in card controls, and inform remote devices of the eminent shutdown of the add-in device. Process block 630 may additionally include a wait time during which the add-in device checks the status of the host and waits for the host to recover, reboot, or otherwise resume operating and providing power to the add-in card.

In the example of FIG. 6, process 630 starts with a process block 632 in which the add-in device stores in persistent storage, e.g., non-volatile memory in the add-in device, any data that the add-in device uses or needs to resume operation. For example, in the system of FIG. 7, when host 720 stops providing power to SPU 720, SPU 720 may store lookup tables mapping data in virtual volumes 730 and backup volumes 740 to the physical locations of the data in backend storage 750.

In a process block 634, the add-in device checks the status of controlled external devices, e.g., peripheral devices connected to and controlled by the add-in device, to instruct any still-active devices that the add-in device controls, to shut down safely. For example, in the system of FIG. 7, when host 720 stops providing power to SPU 720, SPU 720 may confirm that backend storage 750 has stored any data corresponding to virtual volumes 730 or backup virtual volumes 740 that SPU 720 maintains.

In a process block 636, the add-in device may inform other devices of the failure of its host or of an imminent shutdown of the add-in device. For example, in the system of FIG. 7, when host 720 stops providing power to SPU 720, SPU 720 may communicate with other SPU 732 through network 760 and convey status information of host server 710 or SPU 720. In response, any SPU 722 that maintains a backup 742 of a virtual volume 730 may use the backup virtual volume 742 to enable the SPU 722 to process storage operations directed at the virtual volume 730, and any SPU 722 that owns a virtual volume 732 for which SPU 720 maintains a backup 740, may take appropriate action for its owned virtual volumes 732 that SPU 720 will stop or has stopped backing up.

Add-in device 640 in process block 640 powers down only when the add-in device can safely stop operation. In particular, the add-in device may power down when the add-in device is safe and other devices such as peripherals or remote devices can continue operation or safely power down. The process 600, which may be perform using backup power, may thus perform tasks requiring significant processing power and may provide active air flows to avoid overheating.

Although particular implementations have been disclosed herein, these implementations are only examples and should not be taken as limitations. Various adaptations and combinations of features of the implementations disclosed are within the scope of the following claims.

What is claimed is:

1. An add-in device comprising:
    a circuit board assembly configured for mounting in a chassis of a host of the add-in device, the circuit board assembly including one or more active electrical components positioned to receive a first air flow from one or more cooling fans disposed on the chassis of the host, the first air flow providing cooling of the active electrical components;
    an air circulator disposed on the circuit board assembly and operating to pull a second air flow in a different direction from the first air flow, the second air flow providing cooling of the active electrical components; and
    a backup power source connected to provide power to operate the air circulator and the active electrical components in response to the host failing to provide power to the add-in device.

2. The add-in device of claim 1, further comprising a cover mounted on the circuit board assembly, the cover and the circuit board assembly defining a duct through the add-in device, the duct having an inlet and an outlet, the inlet being positioned to receive the first air flow from the host.

3. The add-in device of claim 2, wherein the air circulator resides inside the duct.

4. The add-in device of claim 1, wherein the add-in device operates the air circulator while the host provides power to the add-in device.

5. The add-in device of claim 1, wherein the add-in device turns off the air circulator when the host provides power to the add-in device.

6. The add-in device of claim 1, wherein directions of the first air flow into the add-in device are the same as directions of the second air flow into the add-in device.

7. The add-in device of claim 1, further comprising:
    a processor; and
    a heat sink or spreader disposed on the processor, the air circulator being disposed on the heat sink or spreader and drawing the second air flow through the heat sink or spreader.

8. The add-in device of claim 7, wherein the backup power source is connected to provide power to operate a blower of the air circulator and the processor, wherein the processor is to execute instructions of a shutdown routine to place the add-in device in a safe state, and wherein the device is to power down after the processor completes the shutdown routine.

9. The add-in device of claim 1, further comprising one or more heat sinks or spreaders respectively contacting one or more of the active electrical components, the first air flow passes through the one or more heat sinks or spreaders in directions that are the same as directions that the second air flow passes through the one or more heat sinks or spreaders.

10. The add-in device of claim 1, wherein the air circulator comprises a fan or a blower.

11. The add-in device of claim 1 wherein:
    the circuit board assembly comprises contacts along an edge of the circuit board assembly, the contacts being arranged to plug into and receive power from a computer system,
    wherein the add-in device further comprises:
    a heat sink that is disposed on one of the active electrical components and that receives the first and second air flows; and
    a cover mounted on the circuit board assembly and defining a duct containing the heat sink, the duct having an inlet at a first end of the circuit board assembly and an outlet at a second end of the circuit board assembly, wherein:
    the duct directs the first air flow through the heat sink; and
    the air circulator is in the duct, coupled to the heat sink, and configured to draw the second air flow into the inlet and through the heat sink.

* * * * *